United States Patent
Cheong et al.

(10) Patent No.: US 9,215,469 B2
(45) Date of Patent: Dec. 15, 2015

(54) INTRA-PLANE AND INTER-PLANE PREDICTIVE METHOD FOR RGB IMAGE CODING

(71) Applicant: SONY CORPORATION, Tokyo (JP)

(72) Inventors: Hye-Yeon Cheong, Milpitas, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 27 days.

(21) Appl. No.: 14/323,862

(22) Filed: Jul. 3, 2014

(65) Prior Publication Data

US 2015/0201201 A1 Jul. 16, 2015

Related U.S. Application Data

(60) Provisional application No. 61/925,972, filed on Jan. 10, 2014.

(51) Int. Cl.
| | |
|---|---|
| G06K 9/00 | (2006.01) |
| H04N 19/186 | (2014.01) |
| H04N 19/103 | (2014.01) |
| H04N 19/174 | (2014.01) |
| H04N 19/59 | (2014.01) |
| H04N 19/124 | (2014.01) |
| H04N 19/13 | (2014.01) |

(52) U.S. Cl.
CPC ........... *H04N 19/186* (2014.11); *H04N 19/103* (2014.11); *H04N 19/124* (2014.11); *H04N 19/13* (2014.11); *H04N 19/174* (2014.11); *H04N 19/59* (2014.11)

(58) Field of Classification Search
CPC ... H04N 19/186; H04N 19/59; H04N 19/124; H04N 19/103; H04N 19/174; H04N 19/14; H04N 19/13; H04N 19/176; H04N 19/52; H04N 19/61; H04N 19/46; H04N 19/96; H04N 19/119; H04N 19/154; H04N 19/196; H04N 19/463; H04N 19/53; H04N 19/593; H04N 19/56
USPC .......................................................... 382/166
See application file for complete search history.

(56) References Cited

U.S. PATENT DOCUMENTS

| | | | |
|---|---|---|---|
| 7,333,544 B2 | 2/2008 | Kim et al. | |
| 8,135,225 B2 | 3/2012 | Kim et al. | |
| 8,150,178 B2 * | 4/2012 | Song | H04N 19/105 382/166 |
| 8,325,805 B2 | 12/2012 | Cho et al. | |
| 2007/0014478 A1 * | 1/2007 | Birinov | H04N 19/159 382/236 |
| 2008/0304759 A1 * | 12/2008 | Lee | H04N 19/105 382/238 |
| 2012/0106649 A1 * | 5/2012 | Wang | H04N 19/159 375/240.18 |
| 2012/0307897 A1 * | 12/2012 | Yang | H04N 19/50 375/240.12 |
| 2014/0376611 A1 * | 12/2014 | Kim | H04N 19/176 375/240.02 |
| 2015/0016512 A1 * | 1/2015 | Pu | H04N 19/176 375/240.03 |

* cited by examiner

*Primary Examiner* — Ali Bayat
(74) *Attorney, Agent, or Firm* — John P. O'Banion (57) ABSTRACT

An apparatus and method for enhanced encoding of RGB images is presented. The use of intra-plane prediction, which relies on correlation between neighboring pixels of the same color, is enhanced by adding inter-plane prediction that relies on correlation between neighboring pixels of different colors. Inter-plane prediction is performed on at least one of the colors, and more preferably two of the colors, such as R and B, based on input from G. In at least one embodiment, multiple encoding modes are provided, in which different colors from the RGB image are differently coded with either pulse code modulation (PCM), or differential pulse code modulation (DPCM) at a given quantization level (qn). The quantization level and selection of mode being determined for optimizing coding (e.g., based on bit coverage).

20 Claims, 3 Drawing Sheets

INTRA-PLANE AND INTER-PLANE PREDICTIVE METHOD FOR RGB IMAGE CODING

CROSS-REFERENCE TO RELATED APPLICATIONS

This application claims priority to, and the benefit of, U.S. provisional patent application Ser. No. 61/925,972 filed on Jan. 10, 2014, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This technology pertains generally to image coding, and more particularly to an apparatus and method for utilizing intra and inter-plane prediction during RGB image coding.

2. Technological Background

A RGB color model comprises red (R), green (G) and blue (B) in this additive color model in which R, G and B are added in various amounts toward reproducing a desired color in its spectrum. The RGB model is extensively utilized in various electronic image systems, in particular televisions and computers, although it is also utilized in some instances for digital photography. In the RGB model, zero intensity for each color component yields black, while full intensity for each results in a white. Although the quality of the white light, in relation to true white, depends on the nature of the primary RGB light sources. Each of the RGB colors is quantized to a desired color depth which is expressed as a number of bits, such as from 1 to 24 bits or more, although most typically 8 to 24 bits, depending on the application and its attendant need for color accuracy.

Figure 1:
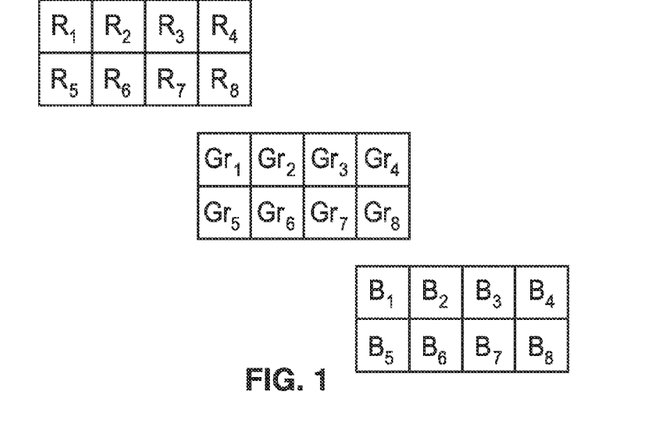
FIG. 1 is a pixel group diagram of RGB color utilized in RGB color encoding.

FIG. 1 depicts the three color planes in RGB coding. By way of example, only 8 pixel groups are seen, $R_1$-$R_8$, $G_1$-$G_8$, and $B_1$-$B_8$, for the sake of convenience of illustration.

Conventional RGB encoding utilizes a combination of pulse code modulation (PCM) and differential pulse code modulation (DPCM) when encoding an RGB image block. In some encoding systems, predictions are performed based on intra-plane correlations, toward increasing coding efficiency. However, it would be beneficial to enhance RGB color encoding to further increase coding efficiency.

Accordingly, the present technology provides additional RGB coding benefits and overcomes shortcomings of previous approaches.

BRIEF SUMMARY

RGB image encoding is enhanced by the disclosed technology by performing inter-plane correlations to enhance the performance of intra-plane correlations, and thus to increase coding efficiency. RGB color images have red ($R_n$), blue ($B_n$), and green ($G_n$) pixels associated with each pixel group number n. Quantization is performed on the pixel data for multiple quantization level (qn) values. Two prediction levels are performed prior to entropy coding. In a first level prediction, intra-plane prediction is performed on each of the colors R, G and B to generate residuals, $\Delta R_n$, $\Delta G_n$, and $\Delta B_n$. Intra-prediction involves neighboring pixels in the same color plane, that is of the same color. Results from the first level prediction are utilized to perform a second level prediction on one or more of the colors, in which inter-plane correlation is taken into account. Inter-prediction involves neighboring pixels in different color planes, that is of different colors. In a preferred embodiment, this second prediction level is performed on the red and blue colors, such as $\Delta\Delta R_n$, $=\Delta R_n - \Delta G_n$, and $\Delta\Delta B_n = \Delta B_n - \Delta G_n$. Entropy coding is performed on the quantized residuals for each color, preferably the residual for red, blue from level 2 prediction and the residual for green from level 1 prediction, to generate an entropy coded RGB bitstream.

In at least one embodiment, multiple encoding modes are generated and selected for encoding the RGB image block. In these modes, colors from the RGB image are coded with pulse code modulation (PCM) or differential pulse code modulation (DPCM) at a given quantization level (qn). In one embodiment a first mode codes all colors in PCM, a second mode codes colors in a mixture of PCM and DPCM, while a third mode code colors in DPCM. In the exemplified case, mode 2 codes green (G) in PCM with red (R) and blue (B) coded in DPCM. The qn selections and mode decision are preferably performed to optimum coding, such as based on a metric known such as bit-coverage, although other metrics can be utilized.

The coding is preferably performed by encoder programming executing on a computer processor and associated memory, although at least portions are amenable to hardware acceleration.

Further aspects of the technology will be brought out in the following portions of the specification, wherein the detailed description is for the purpose of fully disclosing preferred embodiments of the disclosed technology without placing limitations thereon.

BRIEF DESCRIPTION OF THE SEVERAL VIEWS OF THE DRAWING(S)

The disclosed technology will be more fully understood by reference to the following drawings which are for illustrative purposes only.

DETAILED DESCRIPTION OF THE TECHNOLOGY

Motivation for the present technology includes a realization that inter-plane correlation exists within RGB images as well as intra-plane correlation. That is to say, that not only correlations of adjacent pixels of the same color (intra-plane) have significance, but also correlation exists with other colors (inter-plane) within the RGB image. Additional inter-plane correlations are performed, according to the present technology, to enhance RGB image encoding toward compressing the data more efficiently.

Intra-plane correlation, which is a correlation between neighboring pixels of the same color, exploits spatial correlation. In the correlation, it will be appreciated that neighboring pixel samples with the same color tend to have more, similar values compared to distant samples. For example, it is more likely that $|R_1-R_2|<|R_1-R_4|$.

Inter-plane correlation, which is a correlation between neighboring pixels across different colors, exploit inter-color correlation. This inter-plane correlation relies on the observation that spatial value changes and/or fluctuations tends to be similar for neighboring R, G, and B pixels. For example, if $R_1<R_2$, it is likely that such change is also similar for other colors, such as $B_1<B_2$, and $G_1<G_2$.

Figure 2:
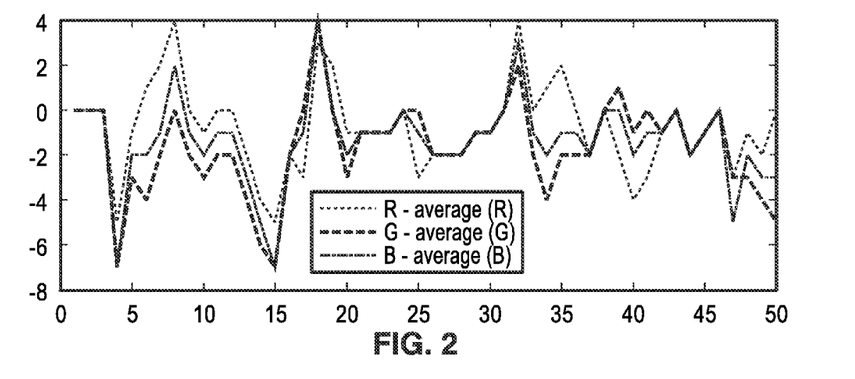
FIG. 2 is a plot of inter-plane correlations (across colors) indicating a basis for performing inter-plane prediction.

FIG. 2 depicts a plot of inter-plane correlations. Fluctuations about the zero value are shown in response to computing R−average(R), G−average(G), and B−average(B) within a given block, the x-axis depicting spatial pixel position in a single row. The figure shows that even though R, G, B have typically very different values, their spatial change (or variation or fluctuation) is correlated across different colors. Toward depicting this in the single plot of FIG. 2, the color mean had to be subtracted from each color. The plot indicates the beneficial basis of operation for augmenting intra-plane prediction with inter-plane prediction.

Figure 3:
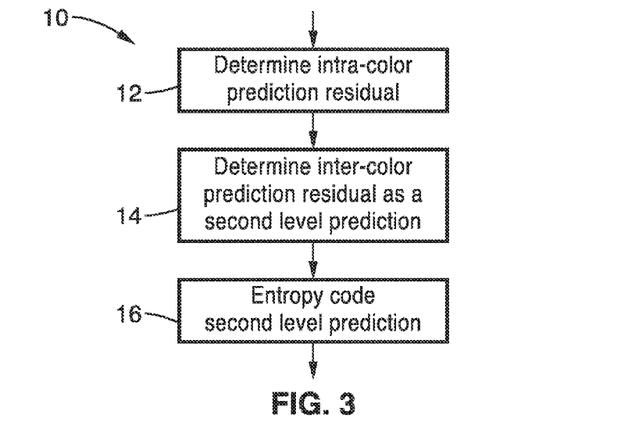
FIG. 3 is a flow diagram of the general method for performing RGB encoding utilizing inter-plane and intra-plane prediction according to an embodiment of the present technology.

FIG. 3 illustrates an example embodiment 10 of intra-plane correlations within RGB encoding. The generalized flow diagram depicts performing a first prediction level in which an intra-color prediction residual is generated 12, followed by performing a second prediction level incorporating intra-color prediction 14. After both prediction levels, entropy coding is performed 16.

The following describes the double level prediction process being performed for a specific pixel group (group n), with processing steps as follows.

A first level of prediction is performed for each pixel group of every color, by computing a spatial prediction residual (Δ) as follows:

$$\Delta R_n = R_n - SP(R_n)$$

$$\Delta G_n = G_n - SP(G_n)$$

$$\Delta B_n = B_n - SP(B_n)$$

where $SP(X_n)$ means "spatial predictor" of color X in pixel group n. Example of SP: $SP(X_6)=X_5$, $SP(X_6)=X_2$, $SP(X_6)=X_5+X_2-X_1$, and so forth. It will be appreciated that $X_n$ needs to be predicted from a neighboring pixel $X_m$, that may be found in any desired direction (e.g., above, left, right, and below) when considering a 2D block, or left or right in a 1D block. However, prediction is preferably performed in relation to neighboring pixels that have already been coded. So for example, in a 1D block (e.g., 8×1), there may be only one preferred choice of a left-side neighbor (e.g., $X_{n-1}$), which has already been coded and can be utilized.

A second level of prediction is performed for each pixel group of every color, by determining a spatial prediction residual which incorporates intra-plane correlations. In the following $\Delta R_n$ and $\Delta B_n$ are again predicted from neighboring $\Delta G_n$:

$$\Delta\Delta R_n = \Delta R_n - \Delta G_n$$

$$\Delta\Delta B_n = \Delta B_n - \Delta G_n$$

It should be noted that G was chosen as a predictor color for inter-color prediction, although R or B can be alternatively chosen without departing from the teachings of the present technology.

Finally, the residuals $\Delta\Delta R_n$, $\Delta\Delta B_n$, $\Delta G_n$ are entropy coded to generate a coded output bitstream.

Figure 4:
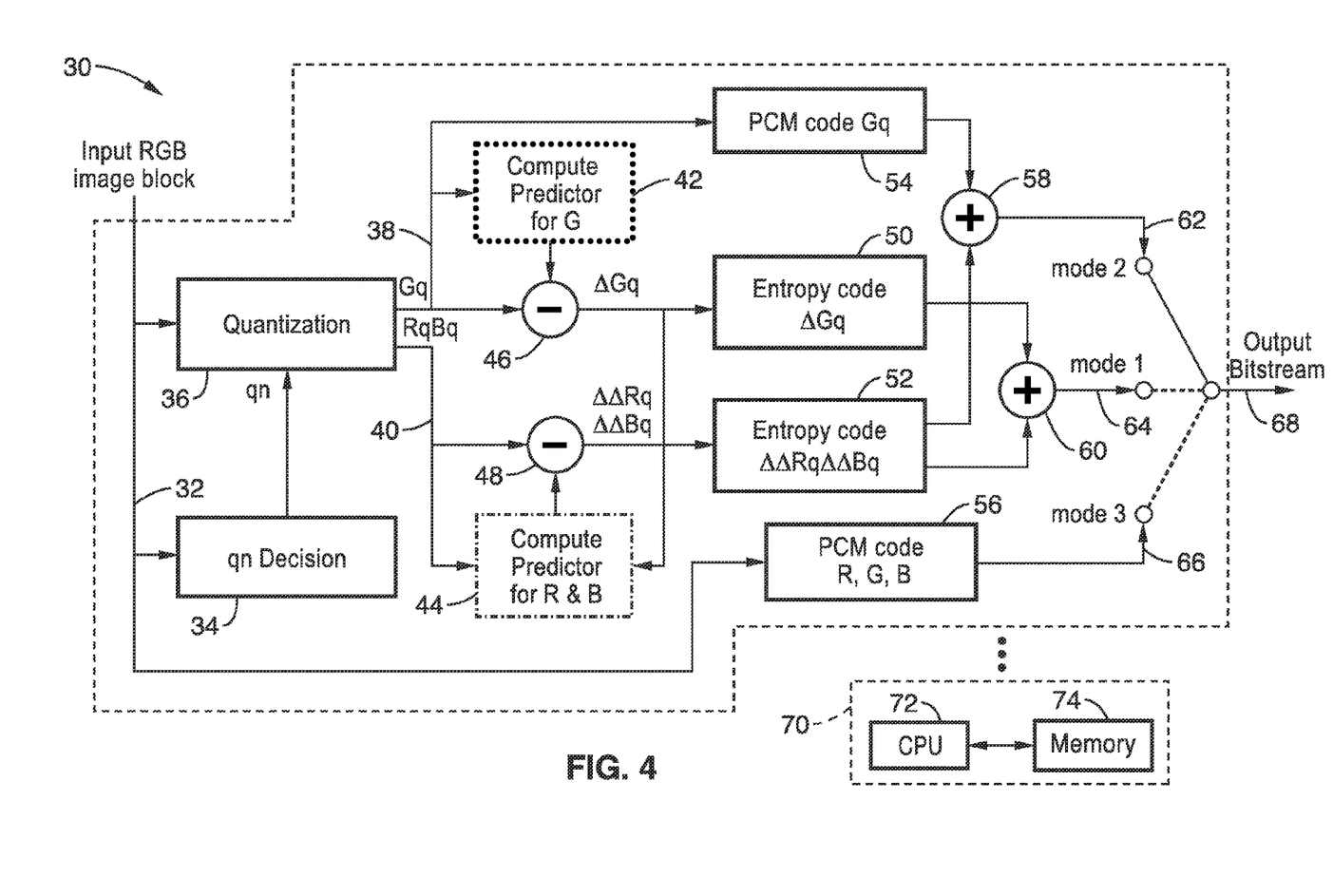
FIG. 4 is a schematic block diagram of RGB encoding utilizing inter and intra-plane prediction according to an embodiment of the present technology.

FIG. 4 illustrates an example embodiment 30 of coding an RGB image block utilizing intra-plane and inter-plane prediction. The example block diagram provides additional details about the operations and method steps. A RGB image block 32 is received, with a qn decision 34 being provided in performing quantization 36. The output bitstream 68 is shown providing a selection of three encoding modes (mode 1 through mode 3), having different mixes of PCM and DPCM encoding.

For each qn value, from 0 through depth-1, a quantization or bit-truncation is performed in which R, G, B for the qn value results in generating Rq, Gq, and Bq. In this example, quantization produces a first output 38 with Gq, and a second output 40 with Rq and Bq. There is a single qn for all colors which means if qn=3 is chosen, we truncate 3 LSBs of each color; whereby G is not quantized any differently than R and B. It should be appreciated that the colors can be grouped in alternative ways without departing from the technology (e.g., grouping GqRq, or Gq, Bq, instead of Rq, Bq as exemplified). The first sample of each color (R, G, B) is PCM coded 56, producing output 66 for mode 3. It should be appreciated that when PCM mode is chosen, coding is performed in an MSB to LSB order as long as the bit-budget allows. For example, for 50% compression of an 8-bit RGB case, PCM mode codes 4 MSBs of each R, G, B.

PCM coding is performed 54 on one of the colors, exemplified as Gq, as received at sum junction 58 for use in mode 2. Residuals are generated as previously described for DPCM coding. In particular, a predictor is shown generated 42 for G (SP(Gn)), with residual ΔGq produced from minus sum junction 46 (difference) of Gq 38 and SP(Gn), which is entropy coded 50, for connection to sum junction 60 for use with mode 1. The predictor of Gq=SP(Gq).

Similarly, predictors for R and B are determined 44 which include inter-plane prediction by receiving ΔGq from minus sum junction 46 (difference). The predictor of Rq=SP(Rq)+Gq−SP(Gq), with the predictor of Bq=SP(Bq)+Gq−SP(Gq). Residuals ΔΔRq and ΔΔBq are output from minus sum (difference) junction 48 to be entropy coded 52 for receipt at sum junctions 58 and 60 for use in mode 1 and mode 2 encoding.

Thus, it is seen that mode 1 encoding comprises DPCM encoding of Rq, Gq, and Bq. In particular, ΔGq from block 50 is summed with ΔΔRq and ΔΔBq from block 52 at sum junction 60 to produce the mode 1 output 64. The output in mode 1 is entropy coding (DPCM) of $\Delta Gq$, $\Delta\Delta Rq$, $\Delta\Delta Bq$ and the refinement bits available because each of these is DPCM coded.

It is also seen that mode 2 encoding comprises PCM coding of one color, herein exemplified as Gq, with the other colors DPCM coded. In particular, Gq from block 54 is summed 58 with $\Delta\Delta Rq$ and $\Delta\Delta Bq$ from block 52 to produce mode 2 output 62. The output in mode 2 is PCM coding of Gq, entropy coding of $\Delta\Delta Rq$, $\Delta\Delta Bq$, and the refinement bits available because Rq and Bq are DPCM coded.

It was already discussed that mode 3 provides for PCM coding of all colors, such as utilized when coding the first samples of each color. In mode 3, the output is merely the PCM coding of R, G, and B, which is independent of qn value, and for which no refinements bits are available.

During the encoding process decisions are made as to the optimum qn value to utilize for quantizing the blocks, and for selecting the best mode. By way of example, these decisions are made on the basis of bit-coverage, although other metrics can be utilized without departing from the teachings of the present technology.

In FIG. 4, the encoding process is seen being performed by a processing means 70 comprising at least one computer processor 72, such as a central processor unit (CPU or GPU), microprocessor, microcontroller, DSP, programmable array devices, or similar devices configured for programmed or programmable execution in performing the prediction and encoding of RBG image blocks. Processing means 70 is also shown with at least one memory 74, such as for storing data and programming for processor 72. The memory may include solid state memory and other computer-readable media. The present technology is non-limiting with regard to memory and computer-readable media, insofar as these are non-transitory, and thus do not constitute a transitory electronic signal.

It should be appreciated that the disclosed apparatus and method can be utilized for both "non-random access" and "random access" conditions. In "random access" conditions, when encoding a given block, the encoder and decoder do not need access to other blocks. This means that the decoder can still decode any given block without having to know information of the other blocks. In contrast to this, under "non-random access" conditions, the ability is needed to access other blocks, such as neighboring blocks, as the predictor is computed based on pixels of the other blocks. This means that the decoder can only decode a given block in random access conditions if the decoder can access other blocks.

Figure 5:
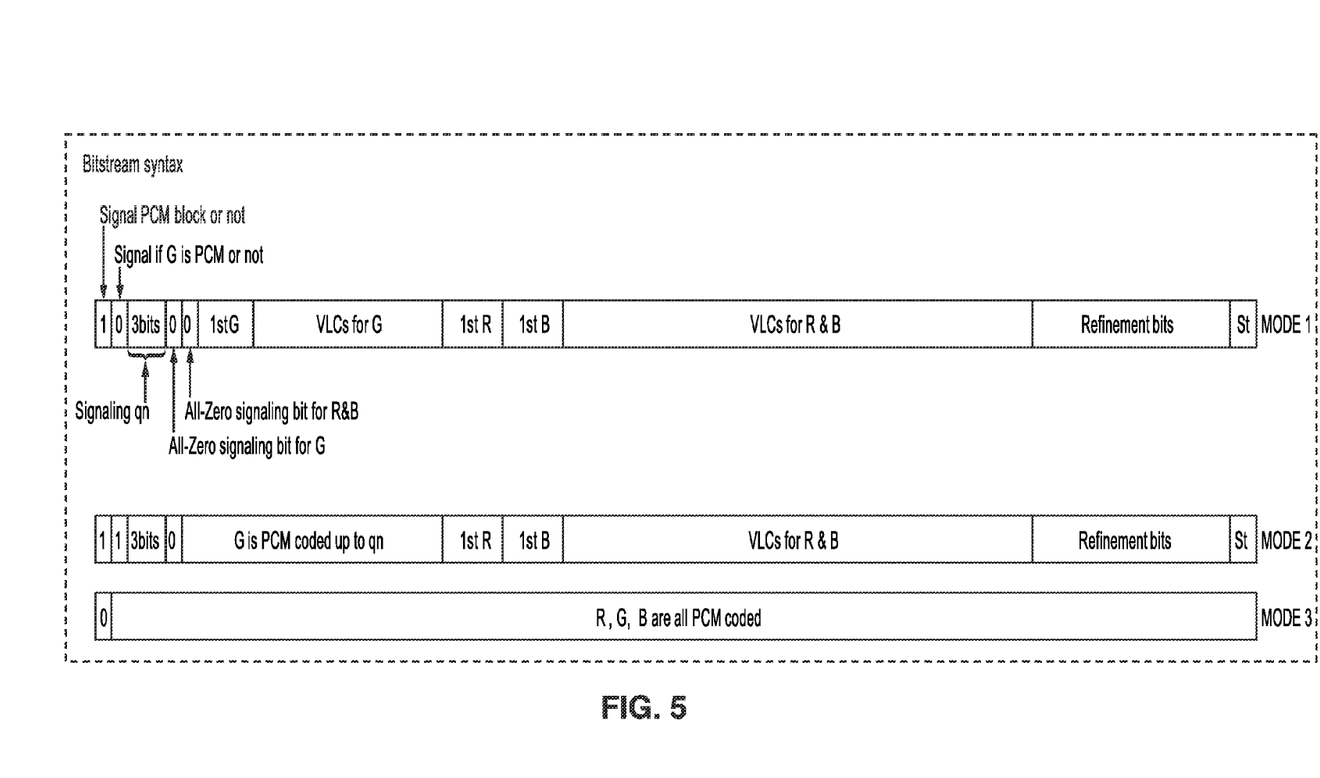
FIG. 5 is a mode word bit diagram illustrating bitstream syntax for encoding three modes according to an embodiment of the present technology.

FIG. 5 illustrates an embodiment of bitstream syntax for each of the encoding modes (modes 1 through 3). The bottom bitstream is the simplest with a first bit at a first state (e.g., equal to 0) indicating the bitstream is PCM coded, with the remaining bit positions utilized for the PCM coding for each color.

It can be seen for mode 1, at the top of the figure, that the first bit (at the right) indicates the bitstream is not all PCM coded. The second bit indicates if one of the colors (e.g., G in this case) is PCM coded. For mode 1, in the top bitstream diagram, G is not PCM coded, whereby the second bit is set equal to 0. It should be appreciated that the bit states described above may be selected as desired for indicating conditions, so for example the second bits for mode 1 and mode 2 can be reversed using a "0" for PCM mode 3, while using a "1" to indicate that G is PCM coded, or vice-versa.

Referring to FIG. 5, three bits are shown for signaling the qn value, followed by bits for signaling whether all-zero signaling is utilized for G and for a combination of R and B. In all zero signaling, an all-zero signaling bit is activated to signal that all residuals are 0, instead of coding all zero residuals. If all-zero signaling bit is 0, then all residuals must be coded. Then the actual color encoding bits are seen with PCM coding of the first sample ($1^{st}$ G), followed by variable length coding (VLC) data for G (VLCs for G). Similarly, for the R and B the diagram shows PCM coding of the first samples ($1^{st}$ R), ($1^{st}$ B), followed by variable length coding (VLC) data for R and B (VLCs for R & B). Refinement bits are seen available in view of the DPCM encoding of R, G and B. The final bit (St) is a "stuffed" zero bit to fill up the fixed bitstream length. It will be noted that if we code everything losslessly and if there is still a bit-budget remaining, then zero-padding can be utilized, such as using stuffed zero bits to fill up the fixed bitstream length.

In the example of mode 2, seen as the middle bitstream of the figure, G is PCM coded and this second bit is exemplified as equal to 1. There is no need for the all-zero signaling bit for G, but one is seen for the combination of R and B. Data is then seen for PCM coding of G up to qn, then followed by data for PCM encoding of R and B first samples, VLCs for R and B, and the refinement bits. It should be appreciated that the bitstream syntax figure shows the same length of signaling bits for mode 1 and mode 2, although they are usually different. It is not necessary, however, that mode 1 has more refinement bits than other modes, as it depends on qn and many other factors. The St (stuffed bits) length can also be different.

It will be appreciated that the decoder side is performed in the reverse order of the encoder, using inverse functions. This process is straightforward, with inverse entropy coding performed to reconstruct residuals, followed by adding appropriate predictors to the residuals. Then a bit shift by qn is performed followed by reconstructing refinement bits. Finally, middle point reconstruction of the uncoded bit-planes is performed.

The present technology can be incorporated within an encoder and decoder, such as for integration with various devices configured for RGB color image capture (e.g., digital cameras, camcorders, and scanners), or in response to receiving color image information from an image capture device.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the description herein, it will be appreciated that that the present disclosure encompasses multiple embodiments which include, but are not limited to, the following:

1. An apparatus for RGB image encoding, comprising: (a) a computer processor configured for receiving color pixel data of an input RGB image containing colors red ($R_n$), blue ($B_n$), and green ($G_n$) pixels associated with each pixel group number n; and (b) programming in a non-transitory computer readable medium and executable on the computer processor for performing steps comprising: (b)(i) performing quantization for multiple quantization level (qn) values; (b)(ii) performing intra-plane prediction on each of the colors R, B and G to generate residuals, $\Delta R_n$, $\Delta G_n$, and $\Delta B_n$, from this first level of prediction in which prediction is performed for a given color based on neighboring pixels of a same color; (b)(iii) performing inter-plane prediction on one or more of the colors to generate residuals from a second level of prediction in which prediction of a given color is based on neighboring pixels of different colors, toward augmenting intra-plane prediction; and (b)(iv) entropy coding the quantized residual to generate an entropy coded RGB bitstream.

2. The apparatus of any preceding embodiment, wherein said programming executable on a non-transitory computer readable medium further comprises performing intra-plane prediction on each of the colors R, G and B to generate residuals, $\Delta R_n$, $\Delta G_n$, and $\Delta B_n$ in response to $\Delta R_n = R_n - SP(R_n)$, $\Delta G_n = G_n - SP(G_n)$, and $\Delta B_n = B_n - SP(B_n)$; wherein SP describes performing an intra-color spatial predictor (SP).

3. The apparatus of any preceding embodiment, wherein said one or more colors on which inter-plane prediction is performed in said second level of prediction comprises the red (R) and blue (B) colors.

4. The apparatus of any preceding embodiment, wherein said residuals from said second level of prediction comprise $\Delta\Delta R_n$ and $\Delta\Delta B_n$ determined in response to $\Delta\Delta R_n = \Delta R_n - \Delta G_n$, and $\Delta\Delta B_n = \Delta B_n - \Delta G_n$.

5. The apparatus of any preceding embodiment, wherein said programming executable on a non-transitory computer readable medium further comprises generating multiple encoding modes in which different colors from the input RGB image are differently coded with pulse code modulation (PCM), or differential pulse code modulation (DPCM) at a given quantization level (qn).

6. The apparatus of any preceding embodiment, wherein said programming executable on a non-transitory computer readable medium further comprises generating multiple encoding modes having one mode in which all colors are PCM coded, another mode in which all colors are DPCM coded and one or more intermediate modes in which a combination of PCM and DPCM coding is performed.

7. The apparatus of any preceding embodiment, wherein said programming executable on a non-transitory computer readable medium further comprises generating multiple encoding modes having one mode in which all colors are PCM coded, another mode in which all colors are DPCM coded and one mode in which green (G) is PCM coded while read (R) and blue (B) are DPCM coded.

8. The apparatus of any preceding embodiment, further comprising a decoding process of inverse entropy coding performed to reconstruct residuals, followed by adding appropriate predictors to the residuals, after which a bit shift by qn is performed followed by reconstructing refinement bits, and then middle point reconstruction of the uncoded bit-planes.

9. The apparatus of any preceding embodiment, wherein said apparatus can be utilized for coding in both random access and non-random access conditions.

10. An apparatus for RGB image encoding, comprising: (a) a computer processor configured for receiving color pixel data of an input RGB image containing colors red ($R_n$), blue ($B_n$), and green ($G_n$) pixels associated with each pixel group number n; and (b) programming in a non-transitory computer readable medium and executable on the computer processor for performing steps comprising: (b) (i) performing quantization for multiple quantization level (qn) values; (b) (ii) performing intra-plane prediction on each of the colors R, B and G to generate residuals, $\Delta R_n$, $\Delta G_n$, and $\Delta B_n$, from this first level of prediction in which prediction is performed for a given color based on neighboring pixels of a same color; (b) (iii) performing inter-plane prediction on one or more of the colors to generate residuals from a second level of prediction in which prediction of a given color is based on neighboring pixels of different colors, toward augmenting intra-plane prediction; wherein residuals are generated by performing intra-plane prediction on each of the colors R, G and B to generate residuals, $\Delta R_n$, $\Delta G_n$, and $\Delta B_n$ in response to $\Delta R_n = R_n - SP(R_n)$, $\Delta G_n = G_n - SP(G_n)$, and $\Delta B_n = B_n - SP(B_n)$, with SP describing an intra-color spatial predictor (SP); (b) (iv) entropy coding the quantized residual to generate an entropy coded RGB bitstream.

11. The apparatus of any preceding embodiment, wherein said one or more colors on which inter-plane prediction is performed in said second level of prediction comprises the red (R) and blue (B) colors.

12. The apparatus of any of the preceding embodiments, wherein said residuals from said second level of prediction comprise $\Delta\Delta R_n$ and $\Delta\Delta B_n$ determined in response to $\Delta\Delta R_n = \Delta R_n - \Delta G_n$, and $\Delta\Delta B_n = \Delta B_n - \Delta G_n$.

13. The apparatus of any preceding embodiment, wherein said programming executable on a non-transitory computer readable medium further comprises generating multiple encoding modes in which different of the colors from the input RGB image are differently coded with pulse code modulation (PCM), or differential pulse code modulation (DPCM) at a given quantization level (qn).

14. The apparatus of any preceding embodiment, wherein said programming executable on a non-transitory computer readable medium further comprises generating multiple encoding modes having one mode in which all colors are PCM coded, another mode in which all colors are DPCM coded and one or more intermediate modes in which a combination of PCM and DPCM coding is performed.

15. The apparatus of any preceding embodiment, wherein said programming executable on a non-transitory computer readable medium further comprises generating multiple encoding modes having one mode in which all colors are PCM coded, another mode in which all colors are DPCM coded and one mode in which green (G) is PCM coded while read (R) and blue (B) are DPCM coded.

16. The apparatus of any preceding embodiment, further comprising inverse entropy coding performed to reconstruct residuals, followed by adding appropriate predictors to the residuals, after which a bit shift by qn is performed followed by reconstructing refinement bits, and then middle point reconstruction of the uncoded bit-planes.

17. The apparatus of any preceding embodiment, wherein said apparatus can be utilized for coding in both random access and non-random access conditions.

18. A method for RGB image encoding, comprising: (a) receiving color pixel data of an input RGB image containing colors red ($R_n$), blue ($B_n$), and green ($G_n$) pixels associated with each pixel group number n within a processing device configured for image coding; and (b) performing quantization for multiple quantization level (qn) values; (c) performing intra-plane prediction on each of the colors R, B and G to generate residuals, $\Delta R_n$, $\Delta G_n$, and $\Delta B_n$, from this first level of prediction in which prediction is performed for a given color based on neighboring pixels of a same color; (d) performing inter-plane prediction on one or more of the colors to generate residuals from a second level of prediction in which prediction of a given color is based on neighboring pixels of different colors, toward augmenting intra-plane prediction; and (e) entropy coding the quantized residual to generate an entropy coded RGB bitstream.

19. The method of any of the preceding embodiments, further comprising performing intra-plane prediction on each of the colors R, G and B to generate residuals, $\Delta R_n$, $\Delta G_n$, and $\Delta B_n$ in response to $\Delta R_n = R_n - SP(R_n)$, $\Delta G_n = G_n - SP(G_n)$, and $\Delta B_n = B_n - SP(B_n)$; wherein SP describes performing an intra-color spatial predictor (SP).

20. The method of any preceding embodiment, wherein said residuals from said second level of prediction comprise $\Delta \Delta R_n$ and $\Delta \Delta B_n$ determined in response to $\Delta \Delta R_n = \Delta R_n - \Delta G_n$, and $\Delta \Delta B_n = \Delta B_n - \Delta G_n$.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1A

Conventional Intra-color Spatial Prediction 8 → 3 bps Coding

| Test Image Sequence | R PSNR | G PSNR | B PSNR |
|---|---|---|---|
| synthetic_RGB-01 | 28.0259 | 28.6183 | 28.6183 |
| synthetic_RGB-02 | 24.8948 | 24.8798 | 24.8798 |
| synthetic_RGB-03 | 24.3197 | 24.3197 | 24.3197 |
| camera_captured_RGB-01 | 29.3908 | 29.7608 | 29.3319 |
| camera_captured_RGB-02 | 32.1654 | 32.6447 | 32.7773 |
| camera_captured_RGB-03 | 55.1356 | 54.9372 | 55.0139 |
| camera_captured_RGB-04 | 25.9926 | 25.1238 | 24.9926 |
| camera_captured_RGB-05 | 59.7332 | 59.6710 | 59.6429 |
| camera_captured_RGB-06 | 38.1745 | 38.7857 | 38.3206 |
| natural_RGB-01 | 39.8717 | 39.0892 | 39.1442 |
| natural_RGB-02 | 37.3728 | 37.0877 | 36.5745 |
| natural_RGB-03 | 35.7576 | 35.8066 | 35.6889 |
| natural_RGB-04 | 37.9031 | 37.8406 | 37.7025 |
| natural_RGB-05 | 41.6308 | 41.6640 | 41.0229 |
| natural_RGB-06 | 36.2426 | 36.2031 | 35.4952 |

TABLE 1B

Conventional Intra-color Spatial Prediction 8 → 4 bps Coding

| Test Image Sequence | R PSNR | G PSNR | B PSNR |
|---|---|---|---|
| synthetic_RGB-01 | 34.2842 | 34.8588 | 34.8588 |
| synthetic_RGB-02 | 31.4407 | 31.4368 | 31.4368 |
| synthetic_RGB-03 | 30.6103 | 30.6103 | 30.6103 |
| camera_captured_RGB-01 | 34.8095 | 35.1794 | 35.5973 |
| camera_captured_RGB-02 | 38.3508 | 38.1506 | 38.7580 |
| camera_captured_RGB-03 | 64.1954 | 63.7720 | 64.0014 |
| camera_captured_RGB-04 | 32.4973 | 31.9265 | 31.7810 |
| camera_captured_RGB-05 | 85.9961 | 85.6043 | 85.2450 |
| camera_captured_RGB-06 | 44.7758 | 44.9846 | 45.0855 |
| natural_RGB-01 | 46.2127 | 45.4981 | 45.5588 |
| natural_RGB-02 | 43.6443 | 43.4051 | 42.8929 |
| natural_RGB-03 | 41.9832 | 41.9891 | 41.8747 |
| natural_RGB-04 | 44.1142 | 44.0509 | 43.9238 |
| natural_RGB-05 | 47.9695 | 47.9705 | 47.3946 |
| natural_RGB-06 | 42.4439 | 42.4227 | 41.6926 |

TABLE 1C

Conventional Intra-color Spatial Prediction 8 → 5 bps Coding

| Test Image Sequence | R PSNR | G PSNR | B PSNR |
|---|---|---|---|
| synthetic_RGB-01 | 40.3990 | 40.9274 | 40.9274 |
| synthetic_RGB-02 | 37.8125 | 37.8096 | 37.8096 |
| synthetic_RGB-03 | 37.1617 | 37.1617 | 37.1617 |
| camera_captured_RGB-01 | 40.9443 | 41.3291 | 41.3937 |
| camera_captured_RGB-02 | 44.3101 | 44.1096 | 44.5102 |
| camera_captured_RGB-03 | 70.9071 | 70.5999 | 70.5360 |
| camera_captured_RGB-04 | 38.6556 | 38.6906 | 38.5169 |
| camera_captured_RGB-05 | Inf | Inf | Inf |
| camera_captured_RGB-06 | 50.7830 | 50.7607 | 50.9586 |
| natural_RGB-01 | 52.1697 | 51.4829 | 51.5385 |
| natural_RGB-02 | 49.4974 | 49.2675 | 48.8176 |
| natural_RGB-03 | 47.8628 | 47.8690 | 47.8065 |
| natural_RGB-04 | 49.9149 | 49.8919 | 49.7563 |
| natural_RGB-05 | 53.8685 | 53.8328 | 53.4086 |
| natural_RGB-06 | 48.3855 | 48.3423 | 47.6232 |

TABLE 2A

Inventive Intra-color + Inter-color Prediction 8 → 3 bps Coding

| Test Image Sequence | R PSNR | G PSNR | B PSNR |
|---|---|---|---|
| synthetic_RGB-01 | Inf | Inf | Inf |
| synthetic_RGB-02 | Inf | Inf | Inf |
| synthetic_RGB-03 | Inf | Inf | Inf |

TABLE 2A-continued

Inventive Intra-color + Inter-color Prediction 8 → 3 bps Coding

| Test Image Sequence | R PSNR | G PSNR | B PSNR |
|---|---|---|---|
| camera_captured_RGB-01 | 39.1665 | 39.0317 | 39.1199 |
| camera_captured_RGB-02 | 42.1362 | 41.5831 | 41.8556 |
| camera_captured_RGB-03 | 63.2709 | 63.0070 | 63.2877 |
| camera_captured_RGB-04 | 31.5468 | 30.1055 | 30.0408 |
| camera_captured_RGB-05 | 71.3907 | 71.3102 | 71.3712 |
| camera_captured_RGB-06 | 47.0686 | 46.8755 | 47.0240 |
| natural_RGB-01 | 43.8776 | 43.0194 | 43.0975 |
| natural_RGB-02 | 40.8284 | 40.4549 | 39.7777 |
| natural_RGB-03 | 42.8385 | 42.7803 | 42.7034 |
| natural_RGB-04 | 44.6784 | 44.5953 | 44.4449 |
| natural_RGB-05 | 46.9269 | 47.0266 | 46.0975 |
| natural_RGB-06 | 42.1258 | 42.0654 | 41.2324 |

TABLE 2B

Inventive Intra-color + Inter-color Prediction 8 → 4 bps Coding

| Test Image Sequence | R PSNR | G PSNR | B PSNR |
|---|---|---|---|
| synthetic_RGB-01 | Inf | Inf | Inf |
| synthetic_RGB-02 | Inf | Inf | Inf |
| synthetic_RGB-03 | Inf | Inf | Inf |
| camera_captured_RGB-01 | 49.6292 | 49.4517 | 49.5592 |
| camera_captured_RGB-02 | 52.0279 | 51.9666 | 51.9990 |
| camera_captured_RGB-03 | 75.3718 | 75.2580 | 75.4808 |
| camera_captured_RGB-04 | 38.2022 | 37.9595 | 37.7827 |
| camera_captured_RGB-05 | Inf | Inf | Inf |
| camera_captured_RGB-06 | 56.6957 | 56.5329 | 56.7224 |
| natural_RGB-01 | 51.0310 | 50.2111 | 50.2611 |
| natural_RGB-02 | 47.8788 | 47.5096 | 46.8503 |
| natural_RGB-03 | 51.0073 | 50.9783 | 50.9566 |
| natural_RGB-04 | 52.3903 | 52.3302 | 52.1805 |
| natural_RGB-05 | 54.4194 | 54.5110 | 53.7207 |
| natural_RGB-06 | 50.0125 | 49.9066 | 49.0971 |

TABLE 2C

Inventive Intra-color + Inter-color Prediction 8 → 5 bps Coding

| Test Image Sequence | R PSNR | G PSNR | B PSNR |
|---|---|---|---|
| synthetic_RGB-01 | Inf | Inf | Inf |
| synthetic_RGB-02 | Inf | Inf | Inf |
| synthetic_RGB-03 | Inf | Inf | Inf |
| camera_captured_RGB-01 | 57.6024 | 57.4477 | 57.5167 |
| camera_captured_RGB-02 | 61.8200 | 61.7912 | 61.5203 |
| camera_captured_RGB-03 | 88.5796 | 88.6263 | 90.0270 |
| camera_captured_RGB-04 | 45.5143 | 45.0935 | 44.9326 |
| camera_captured_RGB-05 | Inf | Inf | Inf |
| camera_captured_RGB-06 | 65.4834 | 65.4110 | 65.6613 |
| natural_RGB-01 | 57.4699 | 56.7166 | 56.7130 |
| natural_RGB-02 | 54.0855 | 53.7561 | 53.1597 |
| natural_RGB-03 | 57.4904 | 57.4455 | 57.4572 |
| natural_RGB-04 | 59.5031 | 59.4059 | 59.2418 |
| natural_RGB-05 | 62.4071 | 62.4113 | 61.8026 |
| natural_RGB-06 | 56.6841 | 56.5540 | 55.8318 |

What is claimed is:

1. An apparatus for RGB image encoding, comprising:
   (a) a computer processor configured for receiving color pixel data of an input RGB image containing colors red ($R_n$), blue ($B_n$), and green ($G_n$) pixels associated with each pixel group number n; and
   (b) programming in a non-transitory computer readable medium and executable on the computer processor for performing steps comprising:
      (i) performing quantization for multiple quantization level (qn) values;
      (ii) performing intra-plane prediction on each of the colors R, B and G to generate residuals, $\Delta R_n$, $\Delta G_n$, and $\Delta B_n$, from this first level of prediction in which prediction is performed for a given color based on neighboring pixels of a same color;
      (iii) performing inter-plane prediction on one or more of the colors to generate residuals from a second level of prediction in which prediction of a given color is based on neighboring pixels of different colors, toward augmenting intra-plane prediction; and
      (iv) entropy coding the quantized residual to generate an entropy coded RGB bitstream.

2. The apparatus recited in claim 1, wherein said programming executable on a non-transitory computer readable medium further comprises performing intra-plane prediction on each of the colors R, G and B to generate residuals, $\Delta R_n$, $\Delta G_n$, and $\Delta B_n$ in response to $\Delta R_n = R_n - SP(R_n)$, $\Delta G_n = G_n - SP(G_n)$, and $\Delta B_n = B_n - SP(B_n)$; wherein SP describes performing an intra-color spatial predictor (SP).

3. The apparatus recited in claim 1, wherein said one or more colors on which inter-plane prediction is performed in said second level of prediction comprises the red (R) and blue (B) colors.

4. The apparatus recited in claim 3, wherein said residuals from said second level of prediction comprise $\Delta\Delta R_n$ and $\Delta\Delta B_n$ determined in response to $\Delta\Delta R_n = \Delta R_n - \Delta G_n$, and $\Delta\Delta B = \Delta B_n - \Delta G_n$.

5. The apparatus recited in claim 1, wherein said programming executable on a non-transitory computer readable medium further comprises generating multiple encoding modes in which different colors from the input RGB image are differently coded with pulse code modulation (PCM), or differential pulse code modulation (DPCM) at a given quantization level (qn).

6. The apparatus recited in claim 5, wherein said programming executable on a non-transitory computer readable medium further comprises generating multiple encoding modes having one mode in which all colors are PCM coded, another mode in which all colors are DPCM coded and one or more intermediate modes in which a combination of PCM and DPCM coding is performed.

7. The apparatus recited in claim 5, wherein said programming executable on a non-transitory computer readable medium further comprises generating multiple encoding modes having one mode in which all colors are PCM coded, another mode in which all colors are DPCM coded and one mode in which green (G) is PCM coded while read (R) and blue (B) are DPCM coded.

8. The apparatus recited in claim 1, further comprising a decoding process of inverse entropy coding performed to reconstruct residuals, followed by adding appropriate predictors to the residuals, after which a bit shift by qn is performed followed by reconstructing refinement bits, and then middle point reconstruction of the uncoded bit-planes.

9. The apparatus recited in claim 1, wherein said apparatus can be utilized for coding in both random access and non-random access conditions.

10. An apparatus for RGB image encoding, comprising:
    (a) a computer processor configured for receiving color pixel data of an input RGB image containing colors red ($R_n$), blue ($B_n$), and green ($G_n$) pixels associated with each pixel group number n; and
    (b) programming in a non-transitory computer readable medium and executable on the computer processor for performing steps comprising:
       (i) performing quantization for multiple quantization level (qn) values;

(ii) performing intra-plane prediction on each of the colors R, B and G to generate residuals, $\Delta R_n$, $\Delta G_n$, and $\Delta B_n$, from this first level of prediction in which prediction is performed for a given color based on neighboring pixels of a same color;

(iii) performing inter-plane prediction on one or more of the colors to generate residuals from a second level of prediction in which prediction of a given color is based on neighboring pixels of different colors, toward augmenting intra-plane prediction;

wherein residuals are generated by performing intra-plane prediction on each of the colors R, G and B to generate residuals, $\Delta R_n$, $\Delta G_n$, and $\Delta B_n$ in response to $\Delta R_n = R_n - SP(R_n)$, $\Delta G_n = G_n - SP(G_n)$, and $\Delta B_n = B_n - SP(B_n)$, with SP describing an intra-color spatial predictor (SP); and (iv) entropy coding the quantized residual to generate an entropy coded RGB bitstream.

11. The apparatus recited in claim 10, wherein said one or more colors on which inter-plane prediction is performed in said second level of prediction comprises the red (R) and blue (B) colors.

12. The apparatus recited in claim 11, wherein said residuals from said second level of prediction comprise $\Delta\Delta R_n$ and $\Delta\Delta B_n$ determined in response to $\Delta\Delta R_n = \Delta R_n - \Delta G_n$, and $\Delta\Delta B_n = \Delta B_n - \Delta G_n$.

13. The apparatus recited in claim 10, wherein said programming executable on a non-transitory computer readable medium further comprises generating multiple encoding modes in which different of the colors from the input RGB image are differently coded with pulse code modulation (PCM), or differential pulse code modulation (DPCM) at a given quantization level (qn).

14. The apparatus recited in claim 13, wherein said programming executable on a non-transitory computer readable medium further comprises generating multiple encoding modes having one mode in which all colors are PCM coded, another mode in which all colors are DPCM coded and one or more intermediate modes in which a combination of PCM and DPCM coding is performed.

15. The apparatus recited in claim 13, wherein said programming executable on a non-transitory computer readable medium further comprises generating multiple encoding modes having one mode in which all colors are PCM coded, another mode in which all colors are DPCM coded and one mode in which green (G) is PCM coded while read (R) and blue (B) are DPCM coded.

16. The apparatus recited in claim 10, further comprising inverse entropy coding performed to reconstruct residuals, followed by adding appropriate predictors to the residuals, after which a bit shift by qn is performed followed by reconstructing refinement bits, and then middle point reconstruction of the uncoded bit-planes.

17. The apparatus recited in claim 10, wherein said apparatus can be utilized for coding in both random access and non-random access conditions.

18. A method for RGB image encoding, comprising:

(a) receiving color pixel data of an input RGB image containing colors red ($R_n$), blue ($B_n$), and green ($G_n$) pixels associated with each pixel group number n within a processing device configured for image coding; and (b) performing quantization for multiple quantization level (qn) values;

(c) performing intra-plane prediction on each of the colors R, B and G to generate residuals, $\Delta R_n$, $\Delta G_n$, and $\Delta B_n$, from this first level of prediction in which prediction is performed for a given color based on neighboring pixels of a same color;

(d) performing inter-plane prediction on one or more of the colors to generate residuals from a second level of prediction in which prediction of a given color is based on neighboring pixels of different colors, toward augmenting intra-plane prediction; and (e) entropy coding the quantized residual to generate an entropy coded RGB bitstream.

19. The method recited in claim 18, further comprising performing intra-plane prediction on each of the colors R, G and B to generate residuals, $\Delta R_n$, $\Delta G_n$, and $\Delta B_n$ in response to $\Delta R_n = R_n - SP(R_n)$, $\Delta G_n = G_n - SP(G_n)$, and $\Delta B_n = B_n - SP(B_n)$; wherein SP describes performing an intra-color spatial predictor (SP).

20. The method recited in claim 19, wherein said residuals from said second level of prediction comprise $\Delta\Delta R_n$ and $\Delta\Delta B_n$ determined in response to $\Delta\Delta R_n = \Delta R_n - \Delta G_n$, and $\Delta\Delta B = \Delta B_n - \Delta G_n$.

\* \* \* \* \*